United States Patent [19]

Roberts

[11] Patent Number: 4,694,925
[45] Date of Patent: Sep. 22, 1987

[54] STEERING APPARATUS

[75] Inventor: Maurice P. Roberts, Lafayette, Ind.

[73] Assignee: TRW Inc., Lyndhurst, Ohio

[21] Appl. No.: 868,602

[22] Filed: May 30, 1986

[51] Int. Cl.⁴ ............................................. B62D 5/04
[52] U.S. Cl. ................................... 180/79.1; 180/148
[58] Field of Search ...................... 180/79.1, 79.3, 79, 180/154, 148

[56] References Cited

U.S. PATENT DOCUMENTS

| | | |
|---|---|---|
| 2,918,827 | 3/1957 | Brown . |
| 4,415,054 | 11/1983 | Drutchas . |
| 4,418,781 | 12/1983 | Rabe et al. . |
| 4,538,698 | 9/1985 | Hashimoto et al. . |
| 4,577,715 | 3/1986 | Saito ................................ 180/79.1 |
| 4,629,024 | 12/1986 | Bucke et al. ..................... 180/79.1 |

FOREIGN PATENT DOCUMENTS

| | | |
|---|---|---|
| 0133003 | 2/1985 | European Pat. Off. . |
| 0148664 | 7/1986 | European Pat. Off. . |
| 60-154955 | 8/1985 | Japan . |
| 2145986 | 9/1983 | United Kingdom . |

Primary Examiner—David M. Mitchell
Assistant Examiner—Donn McGiehan
Attorney, Agent, or Firm—Tarolli, Sundheim & Covell

[57] ABSTRACT

A power steering apparatus includes an electric motor having an output member which is drivingly connected with a planetary gear set. An output member of the planetary gear set rotates a ball nut. A member which is connected with a steering linkage has an external thread convolution which is engaged by the ball nut. Upon rotation of a steering wheel, the electric motor is energized to drive the planetary gear set. The planetary gear set in turn drives the ball nut to move the drive member which is connected with the steering linkage.

12 Claims, 9 Drawing Figures

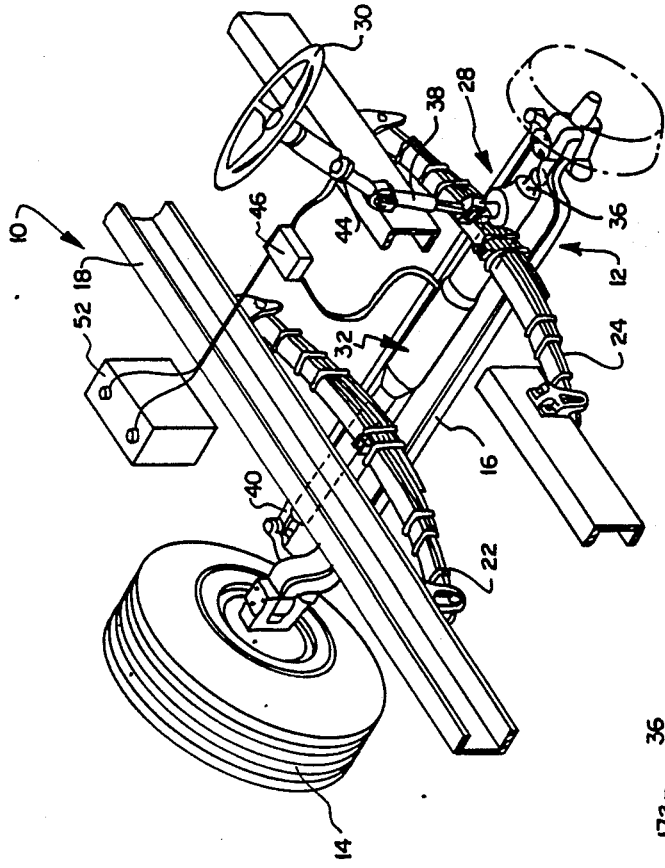
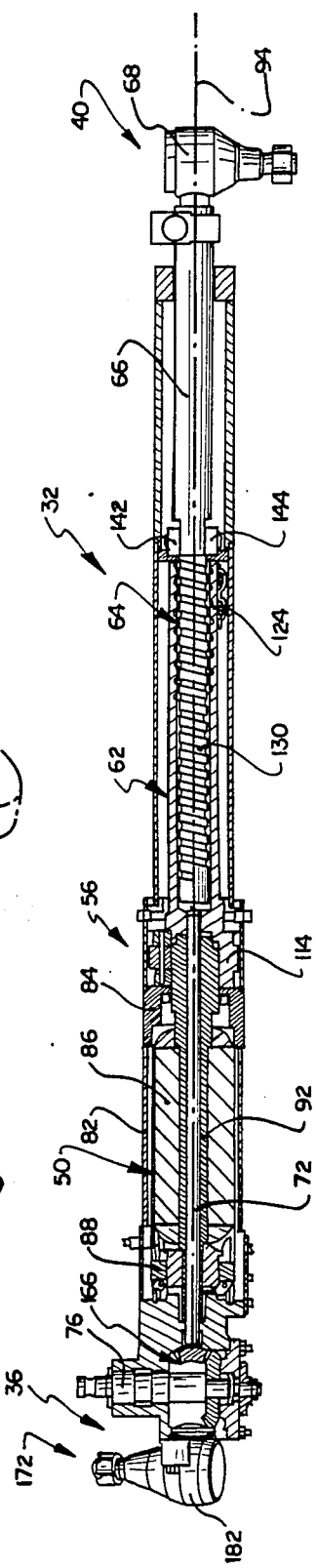

STEERING APPARATUS

BACKGROUND OF THE INVENTION

The present invention relates to a new and improved steering apparatus and, more specifically, to a new and improved power steering apparatus having an electric motor to turn steerable vehicle wheels.

A power steering apparatus having an electric motor to turn steerable vehicle wheels is disclosed in U.S. Pat. No. 4,415,054. The steering apparatus disclosed in this patent has a torque sensor which is actuated upon rotation of the steering wheel. Actuation of the torque sensor causes an electronic control unit to energize the electric motor. The electric motor drives a ball nut. The ball nut cooperates with a screw attached to a rack of a rack and pinion steering mechanism. Rotation of the ball nut moves the screw and the rack axially to effect turning of the vehicle wheels.

In the power steering apparatus of U.S. Pat. No. 4,415,054, the rack extends through a housing fixed with respect to the vehicle and is attached through steering linkages directly to the steerable wheels of the vehicle.

SUMMARY OF THE INVENTION

The present invention provides a new and improved apparatus for providing a power assist to a manual steering input for turning steerable vehicle wheels. The apparatus includes a manually rotatable input member, an electric motor coaxial with the manual input member and which is operable to move a drive member connected with the vehicle steering linkage. The electric motor is connected with the drive member through a planetary gear transmission and a ball nut and screw. By combining the mechanical advantage obtained from the planetary transmission with the mechanical advantage obtained from the ball nut and screw, the ball nut and screw can be provided with a relatively large pitch to transmit relatively large forces to the steerable wheels and the electric motor need not be objectionally large.

The planetary transmission includes a sun gear, ring gear and planet gears which mesh with the sun gear and ring gear. The sun gear is driven by the output member of the electric motor. The ring gear is fixed against rotation. The planet gear carrier is mounted on a transmission output member and the planet gears are rotatable about their axes relative to the carrier and the transmission output member. The output member of the electric motor, the sun gear, planet carrier, and the transmission output member are coaxial. Also, the ball nut rotated by the transmission output member and the screw are coaxial with the transmission output member. Since all of the parts are in a coaxial relationship, an effective package size is achieved.

BRIEF DESCRIPTION OF THE DRAWINGS

The foregoing and other objects and features of the present invention will become more apparent to one skilled in the art upon a reading of the following specification made with reference to the accompanying drawings wherein:

FIG. 1 is a pictorial schematic illustration of a vehicle steering apparatus embodying the present invention;

FIG. 2 is a sectional view of a power steering assembly constructed in accordance with the present invention and embodied in the vehicle steering apparatus of FIG. 1;

DESCRIPTION OF THE PREFERRED EMBODIMENT OF THE INVENTION

Figure 3:
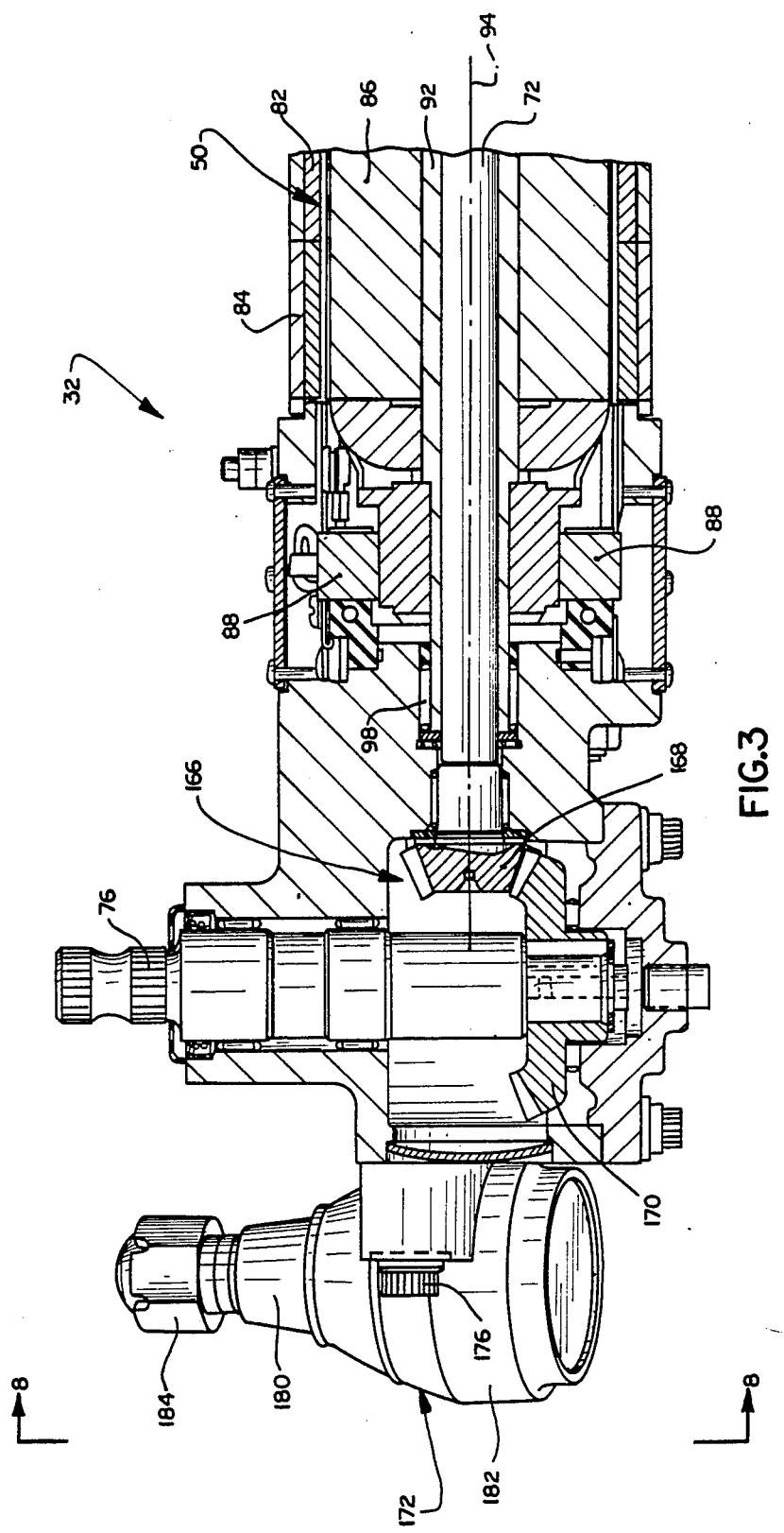
FIG. 3 is an enlarged fragmentary sectional view of a portion of the power steering assembly of FIG. 2.

As shown in FIG. 1, a truck 10 has a steering apparatus 12 for turning steerable vehicle wheels 14. Although only a single wheel 14 is shown in FIG. 1, it should be understood that a pair of steerable wheels are mounted for pivotal movement at opposite ends of an axle 16 of the truck 10. The steerable wheels are connected for conjoint pivotal movement by a drag link 28 and suitable, well known, types of connectors commonly known as tie rod ends. The axle 16 is connected with a frame 18 of the truck 10 by springs 22 and 24.

The steering apparatus 12 (FIG. 1) includes a known steering linkage 28 which is connected with the steerable vehicle wheels 14. Upon rotation of a steering wheel 30, a power steering assembly 32, constructed in accordance with the present invention, is operable to actuate the steering linkage 28 to turn the steerable vehicle wheels 14. A base end portion 36 of the power steering assembly 32 is connected with the axle 16 and with a steering column 38. The opposite or outer end portion 40 of the power steering assembly 32 is connected with the steering linkage 28. When the steerable vehicle wheels 14 are to be turned, the power steering assembly 32 is either extended or retracted to actuate the linkage 28 and thereby effect turning movement of the steerable vehicle wheels.

To initiate turning of the steerable vehicle wheels 14, the steering wheel 30 is rotated manually by a vehicle operator. Rotation of the steering wheel 30 actuates a torque sensor 44 to provide an output signal to an electric control module 46. The output from the control module 46 energizes a reversible electric motor 50 (FIG. 2) in the power steering assembly 32 with current conducted from the vehicle battery 52 (FIG. 1).

The electric motor 50 (FIG. 2) drives a planetary gear transmission 56. The planetary transmission 56 rotates a tubular transmission output member 62 (FIG. 2) to rotate a ball nut 64. The ball nut 64 in turn moves an output member 66 axially to move a ball and socket joint 68 at the outer end portion 40 of the power steering assembly 32. The ball and socket joint 68 is connected to the steering linkage 28 (FIG. 1). Movement of the member 66 (FIG. 2) and the ball socket joint 68 moves the steering linkage 28 to turn the steerable vehicle wheels 14.

The electric motor 50 may be any one of a variety of constructions and may be a "brushless" electric motor. As illustrated, the electric motor 50 includes a stator 82 which is connected with the main housing 84 of the power steering assembly 32. A generally cylindrical armature 86 is circumscribed by the stator 82. The armature 86 is energized by current conducted from the battery 52 (FIG. 1) through the control module 46 to brushes 88 (FIG. 3) disposed in the main housing 84.

A tubular motor output shaft 92 is fixedly secured to the armature 86 and supports the armature for rotation about a central axis 94 of the electric motor 50 and power steering assembly 32. The tubular motor output shaft 92 is supported at its left end (as viewed in FIG. 3) by a bearing 98. The opposite end of the tubular motor output shaft 92 (FIG. 4) extends into the planetary transmission 56 to drive the planetary transmission 56.

Figure 6:
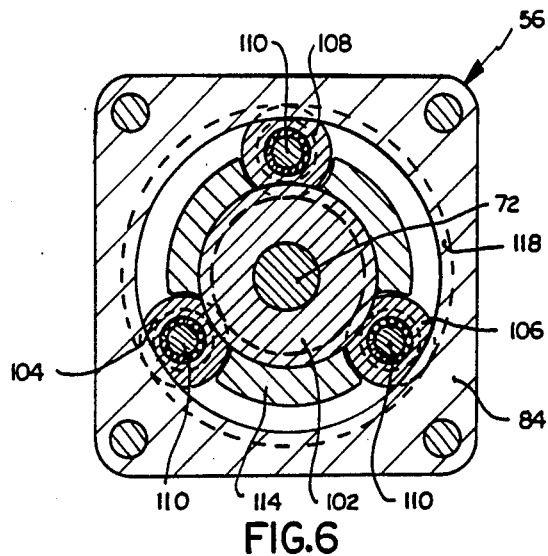
FIG. 6 is a fragmentary sectional view, taken approximately along the line 6—6 of FIG. 4.

The end of the motor output shaft 92 which projects into the planetary transmission has gear teeth which form the sun gear 102 (FIGS. 4 and 6) of the planetary transmission 56. The sun gear 102 is in meshing engagement with a plurality of planet gears 104, 106 and 108 (FIG. 6). The planet gears 104, 106 and 108 are rotatably mounted on stub shafts 110 (FIGS. 4 and 6) disposed on a planet carrier 114. The planet gears 104, 106 and 108 are disposed in meshing engagement with a ring gear 118 which is fixedly connected to the main housing 84 and therefore cannot rotate about its own axis. The sun gear 102, the planet gears 104, 106 and 108, and the ring gear 118 constitute a planetary gear set.

Rotation of the sun gear 102 by the motor output shaft 92 causes the planet gears 104, 106 and 108 to rotate about the stub shafts 110 and relative to the planet carrier 114. Rotation of the planet gears 104, 106 and 108 relative to the stationary ring gear 118 causes the planet gears 104, 106, 108 to orbit and planet carrier 114 to rotate about the central axis 94 of the power steering assembly 32. The planet carrier 114 is located at the left end as viewed in FIGS. 2 and 4, of the transmission output member 62.

The planetary transmission 56 preferably has a 3 to 1 drive ratio. Thus, each time the motor output shaft 92 and sun gear 102 rotate through three revolutions, the planet gears 104, 106 and 108 orbit and the planet carrier 114 rotates through one revolution. This results in the motor output shaft 92 rotating three times as fast as the transmission output shaft 62. Of course, the planetary transmission 56 could be provided with a gear ratio other 3:1.

The ball nut 64 is drivingly connected with the planet carrier 114 of the planetary transmission 56. Thus, the output force provided by the electric motor 50 is increased by the mechanical advantage provided by both the planetary transmission 56 and the ball nut 64. This enables the electric motor 50 to provide relatively large steering forces, such as are commonly required in heavy truck steering without being objectionably large.

Figure 5:
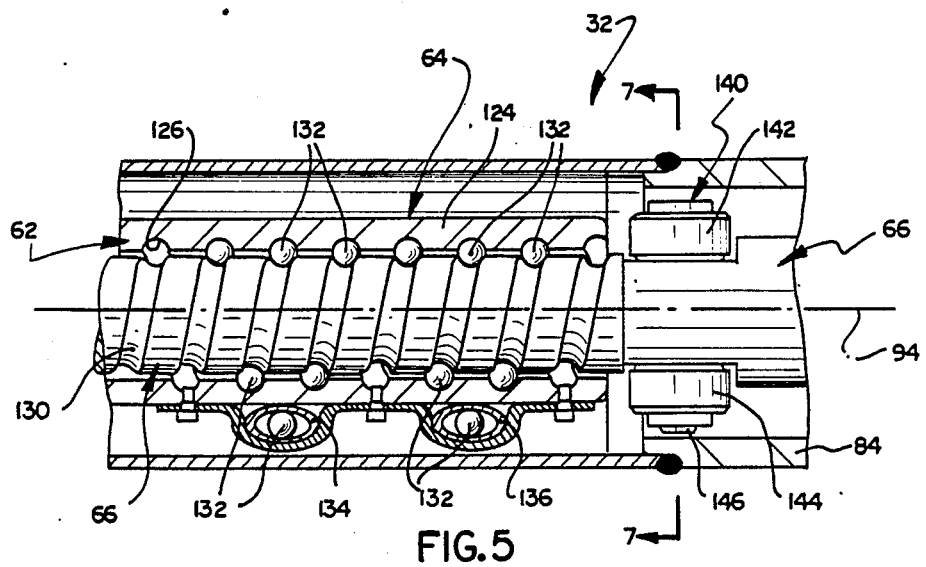
FIG. 5 is an enlarged fragmentary sectional view of still another portion of the power steering assembly of FIG. 2.

The ball nut 64 has an outer housing 124 (FIG. 5) which is integrally formed with the transmission output member 62. The outer housing 124 is provided with an internal thread convolution 126 (FIG. 5). The internal thread convolution 126 circumscribes an external thread convolution 130 on the output member 66. A plurality of spherical balls 132 are interposed between the thread convolutions. A pair of return or transfer tubes 134 and 136 are disposed on the outside of the ball nut housing 124. The return or transfer tubes 134 and 136 provide passages for conducting the balls 132 between axially spaced apart turns of the helical internal and external thread convolutions 126 and 130. Rotation of the ball nut housing 124 causes the balls 132 to axially move the output member 66.

Figure 7:
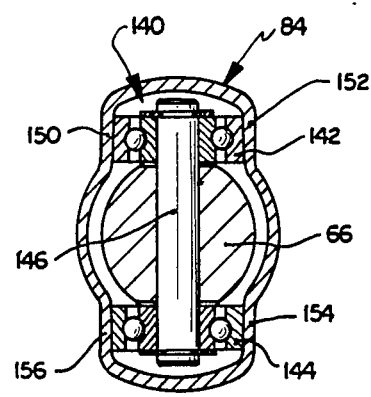
FIG. 7 is a sectional view, taken approximately along the line 7—7 of FIG. 5.

The output member 66 is coaxial with the transmission output member 62 and is held against rotation about the central axis 94 of the power steering assembly 32 by a roller assembly 140 (see FIG. 7). The roller assembly 140 also guides the axial movement of the output member 66. The roller assembly 140 includes a pair of rollers 142 and 144 (FIGS. 5 and 7) which are rotatably mounted on a support pin or axle 146 (FIG. 7) which extends diametrically through the output member 66. The rollers 142 and 144 engage a plurality of tracks 150, 152, 154 and 156 (FIG. 7) formed in the outer end portion of the main housing 84. Although the main housing 84 has been shown in FIG. 7 as being shaped so as to form the tracks 150-156, it is contemplated that the tracks could be formed on the inside of a housing having a different external configuration.

During operation of the power steering assembly, the electric motor 50 rotates the transmission output member 62 about the central axis 94 of the power steering assembly 32 (FIG. 2). A pair of thrust bearings 160 and 162 (FIG. 4) cooperate with the planet carrier 114 to hold the transmission output member 62 against axial movement relative to the main housing 84. Since the output member 66 is held against rotary movement relative to the main housing 84 by the rollers 142 and 144 (FIG. 5), rotation of the transmission output member 62 results in the output member 66 being moved axially relative to the main housing 84 under the influence of drive forces transmitted from the transmission output member 62 and ball nut housing 124 to the output member 66 through the balls 132.

Upon operation of the reversible electric motor 50 in one direction, the output member 66 is moved toward the right (as viewed in FIG. 5) by the ball nut 64. Upon operation of the electric motor 50 in the opposite direction, the output member 66 is moved axially toward the left (as viewed in FIG. 5). It should be noted that the output member 66 has been shown in a fully retracted position in FIGS. 2, 4 and 5 and that subsequent operation of the electric motor 50 will result in the output member 66 being extended toward the right (as viewed in FIGS. 2, 4 and 5).

Internal and external thread convolutions 126 and 130 on the ball nut housing 124 and output member 66, respectively, have a relatively large pitch or lead. This enables relatively large diameter balls 132 to be used in the ball nut 64 and the thickness of the thread convolutions 126 and 130 to be large enough to carry high loads required for heavy truck steering. In one specific embodiment of the invention, the ball nut 64 has a lead of 0.666 turns per inch, and the balls 132 have a diameter of approximately 0.28 inches.

Upon operation of the electric motor 50 to rotate the planetary transmission output member 62 and move the drive member 66 to turn the steerable vehicle wheels, a shaft 72 rotates with the planetary transmission output member 62. The manually operated input shaft 72 extends through the tubular motor output shaft and is coaxial therewith and rotatable relative thereto. Shaft 72 is drivingly connected to the planetary transmission output member 62 to provide for manual vehicle steering.

The shaft 72 (FIGS. 3 and 4) is driven by a bevel gear set 166 (FIG. 3) connected with a shaft 76 connected with the steering wheel 30. The bevel gear set 166 includes a bevel gear 168 connected to the shaft 72. A bevel gear 170 is disposed in meshing engagement with the bevel gear 168 and is connected to the manual steering shaft 76. The end of the shaft 72 opposite from the bevel gear 166 is drivingly connected to the planet carrier 114 and planetary transmission output member 62 (FIG. 4) by splines 72a.

When the steerable vehicle wheels 14 have been turned to an extent corresponding to the amount of rotation of the steering wheel 30, the rotation transmitted from the shaft 72 through the bevel gear set 166 to the shaft 76 and torque sensor 44 will result in the torque sensor providing a null signal to the control module 46. In response to this signal, the control module 46 de-energizes the electric motor 50.

When the steering wheel is turned and then released, road forces applied against the output member 66 are sufficient to move the output member 66 relative to the main housing 84 to a position corresponding to a straight-ahead orientation of the steerable vehicle wheels. The road forces move the drive member 66 axially relative to the ball nut 64. This axial movement results in rotation of the ball nut housing 124 and transmission output member 62. The rotation of the transmission output member 62 results in rotation of the shaft 72. The rotation of the shaft 72 is transmitted through the bevel gear set 166 and the shaft 76 (FIG. 3) to the steering column 38. This rotation causes the steering wheel 30 to rotate back to a position corresponding to a straight-ahead position of the steerable vehicle wheels 14. The relatively large pitch of the thread convolutions 126, 130 on the ball nut and screw enable the power steering assembly 32 to be readily returned to a straight-ahead condition.

Figure 4:
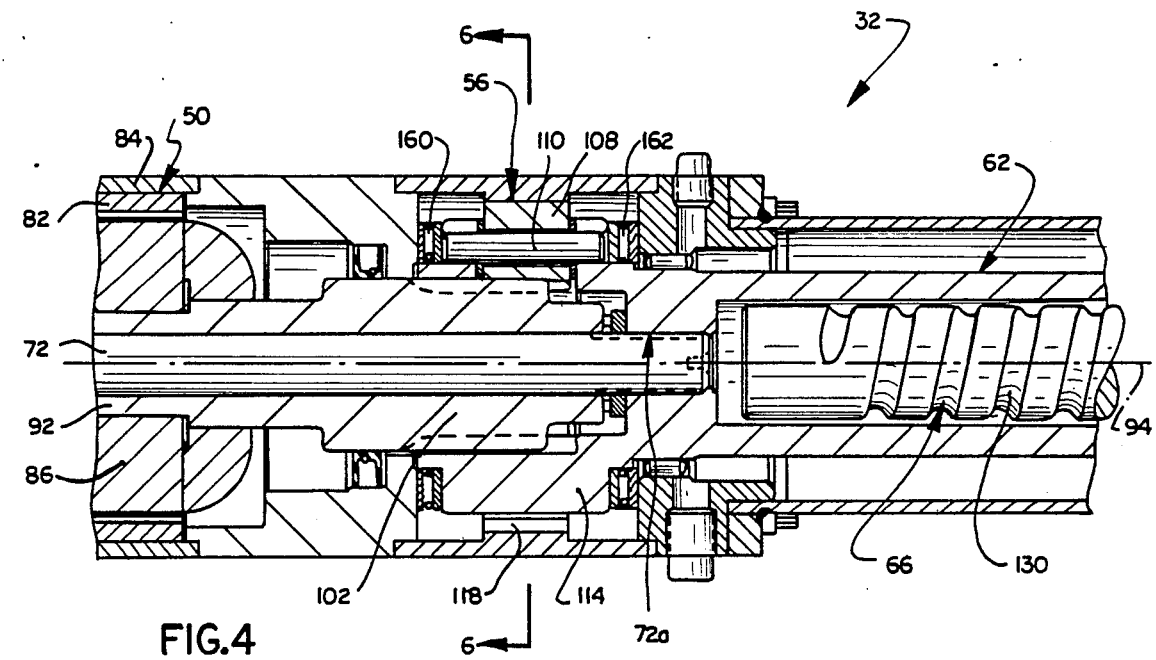
FIG. 4 is an enlarged fragmentary sectional view of another portion of the power steering assembly of FIG. 2.

In the unlikely event that the electric motor 50 would fail to drive the motor output shaft 92 and/or planetary transmission 56 when the steering wheel is turned, the shaft 72 is effective to transmit manual drive forces to the transmission output member 62. Thus, manual rotational force applied to the steering wheel 30 is transmitted through the steering column 38 to the shaft 76 (FIG. 3). The shaft 76 rotates in a direction corresponding to the direction of rotation of the steering wheel. The rotation of the shaft 76 is transmitted to the shaft 72 by the bevel gear set 166. Since the shaft 72 is connected to the transmission output member 62, the rotation of the shaft 72 results in rotation of the transmission output member 62 to rotate the ball nut 64 to move the drive member 66 to effect turning movement of the steerable vehicle wheels 14.

Figure 8:
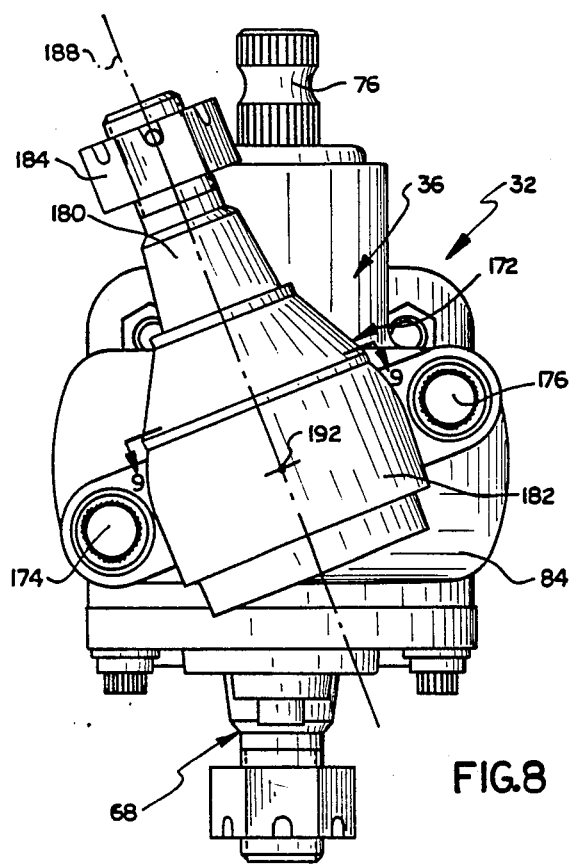
FIG. 8 is an elevational view, taken generally along the line 8—8 of FIG. 3.

The power steering assembly 32 is connected with the axle 16 (FIG. 1) by a ball and socket joint 172 (FIGS. 3 and 8). The ball and socket joint 172 is fixedly connected to the main housing 84 by a pair of bolts 174 and 176 (FIG. 8). The ball and socket joint 172 has a ball stud 180 which projects from a socket housing 182 and is connected with the vehicle axle 16 by a nut 184 on a threaded outer end portion of the ball stud 180.

During operation of the electric motor 50, the ball and socket joint 172 transmits motor reaction forces to the axle 16. The ball and socket joint 172 allows the power steering assembly 32 to rotate about the central axis 188 (FIG. 8) of the ball stud 180 to accommodate the motion of the steering linkage 28. The ball stud 180 is also pivotal about a center 192 (FIG. 8) to move the central axis 188 of the ball stud in a plane defined by the axis 188 and the central axis 94 of the power steering assembly 32 to further accommodate relative movement between the axle 16 and steering linkage 28. However, the socket housing 182 cooperates with the ball stud 180 to hold the ball stud against pivotal movement in a direction transverse to the plane defined by the central axis 188 of the ball stud 180 and the central axis 94 of the power steering assembly 32.

By blocking pivotal movement of the ball stud 180 in a direction transverse to a plane defined by the central axis 188 of the ball stud and the axis 94, the ball stud 180 holds the housing 84 against rotation under the influence of reaction forces applied to the housing by the electric motor 50. Thus, during acceleration and deceleration of the electric motor 50 to rotate the armature 86 relative to the stator 82, the stator applies reaction forces to the housing 84. These reaction forces tend to rotate the housing 84 in either a clockwise or counterclockwise direction (as viewed in FIG. 8) about the central axis 94 of the power steering assembly 32.

Figure 9:
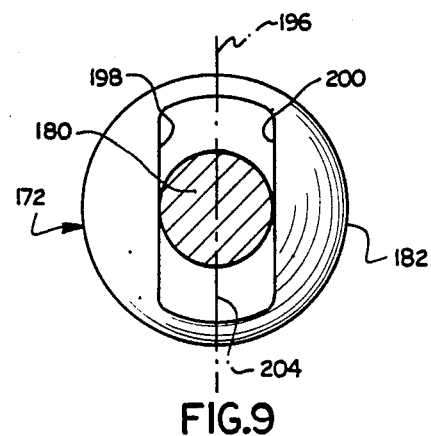
FIG. 9 is a fragmentary sectional view, taken approximately along the line 9—9 of FIG. 8.

To block rotation of the housing 84 under the influence of reaction forces applied to the housing by the electric motor 50, the socket housing 182 is provided with a slot 196 (FIG. 9) having straight side surfaces 198 and 200 which extend parallel to the central axis 94 of the power steering assembly 32. The slot 196 has a central axis 204 which extends parallel to the central axis 94 of the power steering assembly. The slot 196 allows the ball stud 180 to pivot in a direction parallel to the axis 204. However, the side surfaces 198 and 200 block sidewise pivotal movement of the ball stud 180 in a direction transverse to the axis 204.

Electric motor reaction forces are transmitted to the housing 84. These reaction forces are in turn transmitted the socket housing 182. The reaction forces tend to rotate the socket housing 182 relative to the ball stud 180 in a direction transverse to the central axis 204 of the slot 196 and to the central axis 94 of the power steering assembly 32. However, rotation of the socket housing under the influence of the reaction forces is blocked by engagement of a side surfaces 198 or 200 of the slot 196 with the ball stud 180.

Although the ball and socket joint 172 is provided with the slot 196 (FIG. 9) to transmit rotary action forces to the vehicle axle 16, the ball and socket joint 68 (FIG. 2) at the opposite end of the power steering assembly 32 is free to pivot or move in any direction relative to the drive member 66. Thus, the ball and socket joint 68 is ineffective to resist reaction forces during operation of the electric motor 50.

Having described my invention, I claim:

1. An apparatus for use in turning steerable vehicle wheels, said apparatus comprising:

an electric motor having a central axis, said electric motor including a motor output member rotatable about said central axis;

a planetary gear set drivingly connected with said motor output member;

a transmission output member coaxial with said central axis of said electric motor and connected with said planetary gear set and rotatable by said planetary gear set upon rotation of said motor output member;

a ball nut attached to said transmission output member for rotation therewith about said central axis upon rotation of said motor output member;

an externally threaded member disposed in engagement with and circumscribed by said ball nut and coaxial with said central axis and movable axially by said ball nut upon rotation of said motor output member for effecting turning of the steerable vehicle wheels; and a manually rotatable drive shaft extending axially through said electric motor and said planetary gear set, said drive shaft having an input end portion drivingly connected with the steering wheel and an output end portion drivingly connected with said transmission output member.

2. An apparatus as defined in claim 1 wherein said planetary gear set includes a sun gear drivingly connected with said output member, a ring gear fixed from rotation about its axis encircling said sun gear, and planet gears meshing with said sun gear and said ring gear and carried by said transmission output member and rotatable relative to said transmission output member.

3. An apparatus as set forth in claim 1 further including:
a main housing enclosing said electric motor, planetary gear set, and ball nut;
a ball and socket joint connected to said main housing, said ball and socket joint including a ball stud adapted to be connected with the vehicle and a socket housing enclosing one end of the ball stud and connected to said main housing, said socket housing including surface means for blocking movement of said main housing in a direction transverse to the motor axis under the influence of reaction forces transmitted to said main housing from said electric motor.

4. An apparatus as set forth in claim 3 wherein said planetary gear set includes a sun gear disposed in a coaxial relationship with said electric motor, a plurality of planet gears disposed in meshing engagement with said sun gear carried by said transmission output member and rotatable relative to said transmission output member, and a ring gear disposed in meshing engagement with said planet gears and fixed to said main housing.

5. An apparatus as set forth in claim 4 wherein said transmission output member is the planet carrier of said planet gears and is rotatable relative to said ring gear upon relative rotation of said sun and planet gears.

6. An apparatus as set forth in claim 1 further including means for guiding the axial movement of said externally threaded member and for holding said externally threaded member against rotation about its axis.

7. An apparatus as set forth in claim 1 further including:
a main housing enclosing said electric motor, planetary gear set, and ball nut;
a bill and socket joint connected to said main housing, said ball and socket joint including a ball stud adapted to be connected with the vehicle and a socket housing enclosing one end of the ball stud and connected to said main housing, said socket housing including surface means for blocking movement of said main housing in a direction transverse to the motor axis under the influence of reaction forces transmitted to said main housing from said electric motor.

8. An apparatus as set forth in claim 7 further including means for guiding the axial movement of said externally threaded member and for holding said externally threaded member against rotation about its axis.

9. An apparatus comprising:
an electric motor having a central axis, said electric motor including a motor output member rotatable about said central axis;
a planetary gear set drivingly connected with said motor output member;
a transmission output member coaxial with said central axis of said electric motor and connected with said planetary gear set and rotatable by said planetary gear set upon rotation of said motor output member;
said planetary gear set comprising a sun gear drivingly connected with said motor output member, a ring gear fixed against rotation about its own axis, and planet gears meshing with said sun gear and said ring gear, mounted on said transmission output member and rotatable about their own axes relative to said transmission output member;
a ball nut drivingly connected with said transmission output member for rotation upon rotation of said motor output member;
an externally threaded member disposed in engagement with and circumscribed by said ball nut and coaxial with said ball nut and movable axially by said ball nut upon rotation of said motor output member; and
a manually rotatable drive shaft extending axially through said electric motor and said planetary gear set, said drive shaft having an input end portion and an output end portion drivingly connected with said transmission output member.

10. An apparatus comprising:
a housing;
a manually rotatable input member mounted within said housing;
an electric motor located concentrically of said input member and having a rotary armature;
a sensor for detecting torque in said input member and for actuating said electric motor;
a first gear concentric with said input member and driven by said armature;
at least one planet gear in mating engagement with said first gear;
a planet carrier drivingly connected with said input member, said planet carrier supporting said planet gear for rotation about the axis thereof and being rotatable about the axis of said input member;
a ring gear fixed to said housing and meshing with said planet gear;
ball nut means concentric with said input member and driven by said planet carrier, said ball nut means having a threaded protion with at least one ball therein; and
a linear actuator member located concentrically of said ball nut and including a circumferential recess in the form of a thread for receiving said ball, said thread having a lead angle so that rotation of said ball nut causes axial movement of said actuator member.

11. An apparatus as set forth in claim 10 further comprising guiding means for axially guiding said linear actuator member and for holding said linear actuator member against rotation about its axis.

12. An apparatus as set forth in claim 10 further comprising a ball and socket joint for connecting said apparatus to a vehicle axle, said ball and socket joint including a ball stud to be connected with the axle and a socket housing enclosing one end of the ball stud and connected to said housing, said socket housing including surface means for blocking movement of said housing in a direction transverse to the motor axis under the influence of reaction forces transmitted to said housing from said electric motor.

* * * * *